(12) United States Patent
Changlong

(10) Patent No.: US 11,101,498 B2
(45) Date of Patent: Aug. 24, 2021

(54) ELECTROLYTE AND LITHIUM-ION BATTERY CONTAINING THE SAME

(71) Applicant: Contemporary Amperex Technology Co., Limited, Ningde (CN)

(72) Inventor: Han Changlong, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 581 days.

(21) Appl. No.: 15/485,716

(22) Filed: Apr. 12, 2017

(65) Prior Publication Data
US 2017/0301952 A1    Oct. 19, 2017

(30) Foreign Application Priority Data
Apr. 15, 2016 (CN) .......................... 201610235407.1

(51) Int. Cl.
| | |
|---|---|
| H01M 10/0567 | (2010.01) |
| H01M 4/505 | (2010.01) |
| H01M 4/525 | (2010.01) |
| H01M 10/0525 | (2010.01) |
| H01M 10/0568 | (2010.01) |
| H01M 10/0569 | (2010.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 2220/20* (2013.01); *H01M 2300/0037* (2013.01); *Y02E 60/10* (2013.01)

(58) Field of Classification Search
CPC ......... H01M 10/0567; H01M 10/0568; H01M 10/0569; H01M 4/525; H01M 2220/20; H01M 2230/0037; H01M 10/0525; H01M 4/505
See application file for complete search history.

(56) References Cited

U.S. PATENT DOCUMENTS

| | | | | |
|---|---|---|---|---|
| 2013/0280622 | A1* | 10/2013 | Tokuda | H01M 10/0568 429/338 |
| 2015/0140448 | A1* | 5/2015 | Takiguchi | H01M 10/0525 429/332 |
| 2015/0200422 | A1* | 7/2015 | Lee | H01M 10/0567 429/332 |
| 2015/0200423 | A1* | 7/2015 | Mita | H01M 10/0567 429/61 |
| 2017/0033402 | A1* | 2/2017 | Kubota | H01M 2/1653 |

FOREIGN PATENT DOCUMENTS

| | | |
|---|---|---|
| CN | 101217204 A | 7/2008 |
| CN | 103000944 A | 3/2013 |
| CN | 103597647 A | 2/2014 |
| CN | 104752766 * | 7/2015 |
| CN | 104979586 A | 10/2015 |

OTHER PUBLICATIONS

English Translation CN 104752766 (YR: 2015).*
Leggesse et al ("Theoretical study fo reductive decomposition of 1,3-propane sultone: SEI forming additive in lithium-ion batteries" RSC Advances, 2012, 2, 5439-5336).*
Chinese Office Action corresponding to Chinese Application No. 201610235407.1, dated Feb. 22, 2018, pp. 1-18.
Chinese Office Action dated May 18, 2018 for corresponding Chinese Application No. 201610235407.1.

* cited by examiner

*Primary Examiner* — Stephen J Yanchuk
(74) *Attorney, Agent, or Firm* — Tarolli, Sundheim, Covell & Tummino LLP

(57) ABSTRACT

The present application relates to the technical field of lithium-ion batteries and, specifically, relates to an electrolyte and a lithium-ion battery containing the electrolyte. The electrolyte of the present application comprises a lithium salt, an organic solvent and additives that include additive A, additive B and at least one of additive C and additive D; in which, the additive A is a cyclic sultone; the additive B is a cyclic sulfate; the additive C is a silane phosphate compound and/or a silane borate compound; and the additive D is a fluoro-phosphate salt. The battery of the present application has low gas production at high temperature, high capacity retention rate and high power at low temperature as a function of synergistic effects of additives.

11 Claims, No Drawings

ELECTROLYTE AND LITHIUM-ION BATTERY CONTAINING THE SAME

CROSS-REFERENCE TO RELATED APPLICATIONS

The present application claims priority to Chinese Patent Application No. 201610235407.1, filed on Apr. 15, 2016, the content of which is incorporated herein by reference in its entirety.

TECHNICAL FIELD

The present application relates to the technical field of lithium-ion batteries and, specifically, relates to an electrolyte and a lithium-ion battery containing the electrolyte.

BACKGROUND

Lithium-ion batteries have advantages of higher energy density and longer cycle life as compared with lead-acid batteries, nickel-hydrogen batteries and nickel-cadmium batteries, so that lithium-ion batteries have been widely applied in various fields.

In the application of electric vehicles, it is required that the battery has low impedance, long calendar life and long cycle life. The low internal resistance improves acceleration and dynamic performance of vehicles, which can maximize energy recovery and fuel efficiency of the battery when applied in hybrid electric vehicle. Long calendar life and cycle life can guarantee high reliability of batteries, so that vehicles can maintain good performance during daily-life operation. Interaction between the electrolyte and electrodes plays an important role to these performances. Thus, in order to meet demands of electric vehicles on batteries, it is required to provide an electrolyte and a lithium-ion battery which have good performance in abovementioned aspects.

Accordingly, the present application is proposed.

SUMMARY

Firstly, the present application aims to provide an electrolyte.

Secondly, the present application aims to provide a lithium-ion battery containing the electrolyte.

In order to accomplish purposes of the present application, the technical solution includes:

The present application relates to an electrolyte, including a lithium salt, an organic solvent and additives, the additives include additive A, additive B and at least one of additive C and additive D;

wherein the additive A is a cyclic sultone; the additive B is a cyclic sulfate; the additive C is a silane phosphate compound and/or a silane borate compound; and the additive D is a fluoro-phosphate salt.

Preferably, the additives include the additive A, the additive B, the additive C and the additive D.

Preferably, the additive A is selected from a group consisting of compounds shown as Formula Ia, compounds shown as Formula Ib and combinations thereof;

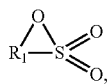
(Ia)

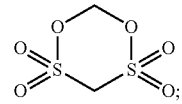
(Ib)

wherein, $R_1$ is selected from a group consisting of substituted $C_{3\sim8}$ alkylenes with a substituting group and unsubstituted $C_{3\sim8}$ alkylenes;

wherein the substituting group is selected from a group consisting of $C_{1\sim6}$ alkyls and halogens;

the Additive A is preferably selected from a group consisting of 1,3-propanesultone, 1,4-butanesultone, 1,5-pentanesultone, 1,6-hexnaesultone, methylene methanedisulfonate and combinations thereof;

a content of the additive A is preferably 0.01~0.5% by mass of the electrolyte.

Preferably, the additive B is selected from a group consisting of compounds shown as formula II and combinations thereof;

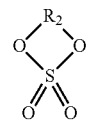
(II)

wherein, $R_2$ is selected from a group consisting of substituted $C_{1\sim6}$ alkylenes with a substituting group and unsubstituted $C_{1\sim6}$ alkylenes;

wherein the substituting group is selected from a group consisting of $C_{1\sim6}$ alkyls and halogens;

the additive B is preferably selected from a group consisting of 1,2-ethylene sulfate, 1,3-propylene sulfate, propane 1,2-cyclic sulfate and combinations thereof;

a content of the additive B is preferably 0.01~5% by mass of the electrolyte.

Preferably, the additive C is selected from a group consisting of compounds shown as formula IIIa, compounds shown as Formula IIIb, compounds shown as Formula IIIc and combinations thereof;

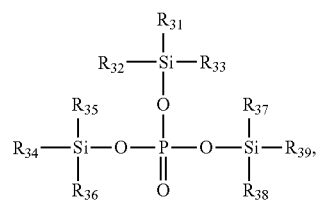
(IIIa)

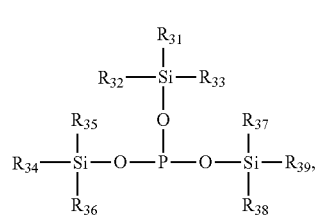
(IIIb)

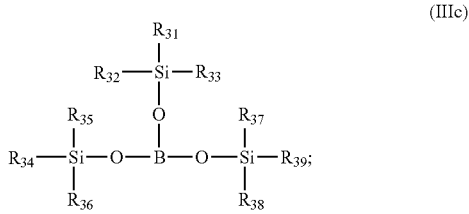

wherein, $R_{31}, R_{32}, R_{33}, R_{34}, R_{35}, R_{36}, R_{37}, R_{38}$ and $R_{39}$ are selected from a group consisting of substituted $C_{1\sim6}$ alkyls with a substituting group and unsubstituted $C_{1\sim6}$ alkyls, respectively;

wherein the substituting group is selected from a group consisting of $C_{1\sim6}$ alkyls and halogens;

the additive C is preferably selected from a group consisting of tris(trimethylsilyl) phosphate, tris(trimethylsilyl) phosphite, tris(trimethylsilyl) borate and combinations thereof;

a content of the additive C is preferably 0.01~2% by mass of the electrolyte.

Preferably, the additive D is selected from a group consisting of $LiPOF_4$, $KPOF_4$, $NaPOF_4$, $NaPO_2F_2$, $LiPO_2F_2$, $KPO_2F_2$ and combinations thereof;

a content of the additive D is preferably 0.01~2% by mass of the electrolyte.

Preferably, the organic solvent is at least two of ethylene carbonate, propylene carbonate, butylene carbonate, fluoro-ethylene carbonate, dimethyl carbonate, diethyl carbonate, dipropyl carbonate, ethyl methyl carbonate, methyl propyl carbonate, ethyl propyl carbonate, γ-butyrolactone, methyl propionate, methyl butyrate, ethyl acetate, propyl propionate, ethyl propionate and ethyl butyrate.

Preferably, the lithium salt is selected from a group consisting of lithium hexafluorophosphate, lithium tetrafluoroborate, lithium bis(oxalate)borate, lithium oxalyldifluoroborate and combinations thereof, and lithium hexafluorophosphate is more preferred.

The present application further relates to a lithium-ion battery, including a positive electrode, a negative electrode, a separator and the electrolyte according to the present application.

Preferably, a material for the positive electrode is a lithium nickel-manganese-cobalt oxide material which is preferably selected from a group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNiO_{0.8}Co_{0.1}Mn_{0.1}O_2$ and combinations thereof.

The technical solutions of the present application have at least the following beneficial effects:

In the present application, film components which mainly consists of inorganic salts and is formed by cyclic sulfate have good stability at elevated temperature due to combination and synergistic effects among additives of sultones, cyclic sulfates, silane phosphates or silane borates and fluoro-phosphate salts; additionally, a compact film is formed by adopting sultones, which reduces direct contact of the highly active oxygen and nickel with the electrolyte, so as to reduce gas production. Furthermore, the use of silane phosphates, silane borates or fluoro-phosphates modifies the state of sultones which form the film, which reduces impedance; according to above modifications, the battery has relatively low gas production and high capacity retention rate at high temperature, and high power at low temperature.

In the present application, the material for the positive electrode adopts a ternary material. The ternary material has strong surface oxidation performance which differs from the materials such as lithium cobalt oxides. The formed film of sultones at the positive electrode allows for much more sulfur elements at the active sites, which reduces the catalytic activities of nickel, cobalt and manganese; the film mainly composed of inorganic salt which is formed by using the cyclic sulfate has highly thermal stability, which compensates for the disadvantages of poor thermal stability of nickel at the surface of the material at high temperature. The film formed by sultones is modified by silane phosphates and silane borates and thus has reduced impedance; moreover, the film of fluoro-phosphates formed at the surface of the positive electrode improves the oxidation stability of the electrolyte and, at the same time, reduces the increase of internal resistance of the sultones after cycle.

The present application is further described in the following embodiments, however, these embodiments are merely exemplary, which do not constitute any limit to the protection scope of the present application.

DESCRIPTIONS

The present application provides an electrolyte and a secondary lithium-ion battery using the electrolyte, so as to guarantee that the battery has low internal resistance, good storage property and good cycle performance.

The electrolyte of the present application includes a lithium salt, an organic solvent and additives, the additives include additive A, additive B and at least one of additive C and additive D; in which, additive A: cyclic sultones;
additive B: cyclic sulfates;
additive C: silane phosphate compounds and/or silane borate compounds;
additive D: fluoro-phosphate salts.

That is to say, the electrolyte of the present application may contain additive A, additive B and additive C; or additive A, additive B and additive D; or additive A, additive B, additive C and additive D.

To improve the electrolyte of the present application, the additives may include additive A, additive B, additive C and additive D at the same time.

To improve the electrolyte of the present application, the additive A can be selected from a group consisting of compounds shown as Formula Ia, compounds shown as Formula Ib and combinations thereof,

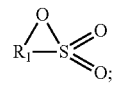

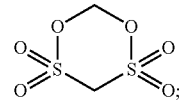

in which, $R_1$ is selected from a group consisting of substituted $C_{3\sim8}$ alkylenes with a substituting group and unsubstituted $C_{3\sim8}$ alkylenes;

wherein the substituting group is selected from a group consisting of $C_{1\sim6}$ alkyls and halogens.

In the present application, the $C_{3\sim8}$ alkylene is a straight or branched alkylene which has 3~8 carbon atoms, the lower limit value of the number of carbon atoms in the alkylene is preferably 3 or 4, and the upper limit value of the number of carbon atoms in the alkylene is preferably 4, 5 or 6. The alkylene has preferably 3~7 carbon atoms, more preferably 3~6 carbon atoms. Examples of the alkylene include propilidene, isopropilidene, butylidene, isobutylidene, secbutylidene, pentylidene and hexylidene.

The $C_{1\sim6}$ alkyl may be a chainlike or cyclic alkyl which has 1~6 carbon atoms; a hydrogen on the ring of the cyclic alkyl may be substituted by an alkyl; the lower limit value of the number of carbon atoms in the alkyl is preferably 2 or 3, and the upper limit value is preferably 4, 5 or 6. The alkyl is preferably a chainlike alkyl with 1~3 carbon atoms. Examples of the alkyls include methyl, ethyl, n-propyl, iso-propyl, n-butyl, isobutyl, sec-butyl, tert-butyl, n-pentyl, iso-pentyl, neopentyl, hexyl, 2-methylpentyl, 3-methylpentyl, 1,1,2-trimethylpropyl, and 3,3-dimethylbutyl.

The halogen is selected from a group consisting of fluorine, chlorine, bromine and iodine, and is preferably fluorine.

As an improvement to the electrolyte of the present application, the additive A is selected from a group consisting of the following compounds and combinations thereof:

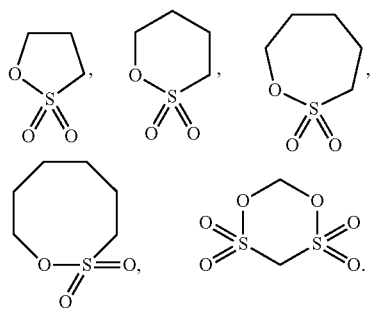

As an improvement to the electrolyte of the present application, the additive A may be otherwise selected from a group consisting of the following compounds and combinations thereof:

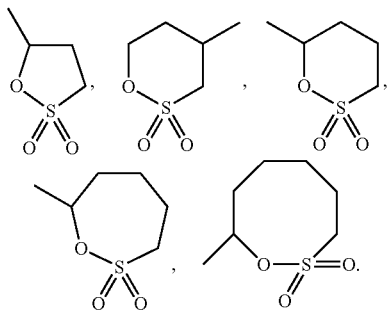

As an improvement to the electrolyte of the present application, a content of the additive A is 0.0~0.5% by mass of the electrolyte. The upper limit value of the content of the additive A may be 0.35%, 0.4% or 0.45%, the lower limit value of the content of the additive A may be 0.02%, 0.05%, 0.1%, 0.2% or 0.25%, and the content of the additive A can be of any range defined by any one of the upper limit values and any one of the lower limit values. There will be excessive resistance during the formation of film if the content of the additive A is more than 5%, and thus the effect of reducing the gas production will be less significant with the increase of the content of the additive A. A less compact film, which may not effectively reduce the direct contact between the high-active oxygen and nickel at the positive electrode and the electrolyte, will be formed if the content of the additive A is less than 0.01%, so that large gas production may be brought.

As an improvement to the electrolyte of the present application, the additive B is selected from a group consisting of compounds shown as Formula II and combinations thereof;

in which, $R_2$ is selected from a group consisting of substituted $C_{1\sim6}$ alkylenes with a substituting group and unsubstituted $C_{1\sim6}$ alkylenes;

wherein the substituting group is selected from a group consisting of $C_{1\sim6}$ alkyls and halogens.

As an improvement to the electrolyte of the present application, the additive B is selected from a group consisting of the following compounds and combinations thereof;

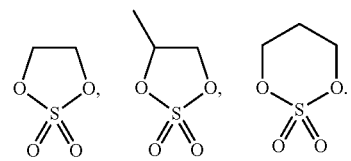

As an improvement to the electrolyte of the present application, the additive B may be otherwise selected from a group consisting of the following compounds and combinations thereof;

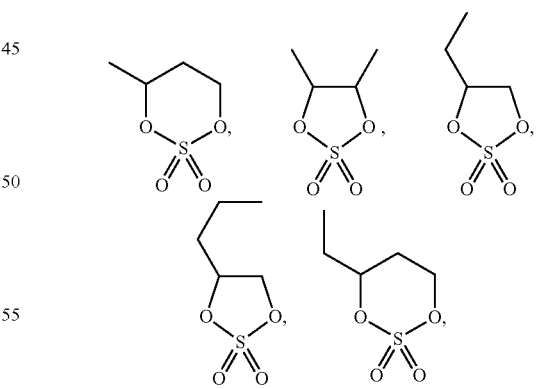

As an improvement to the electrolyte of the present application, a content of the additive B is 0.01%-5% by mass of the electrolyte. The upper limit value of the content of the additive B may be 3.5%, 4%, 4.5% or 4.8%, the lower limit value of the content of the additive B may be 0.02%, 0.05%, 0.1%, 0.2% or 0.25%, and the content of the additive B can be of any range defined by any one of the upper limit values and any one of the lower limit values.

As an improvement to the electrolyte of the present application, the additive C is selected from a group consisting of compounds shown as Formula IIIa, compounds shown as Formula IIIb, compounds shown as Formula IIIc and combinations thereof;

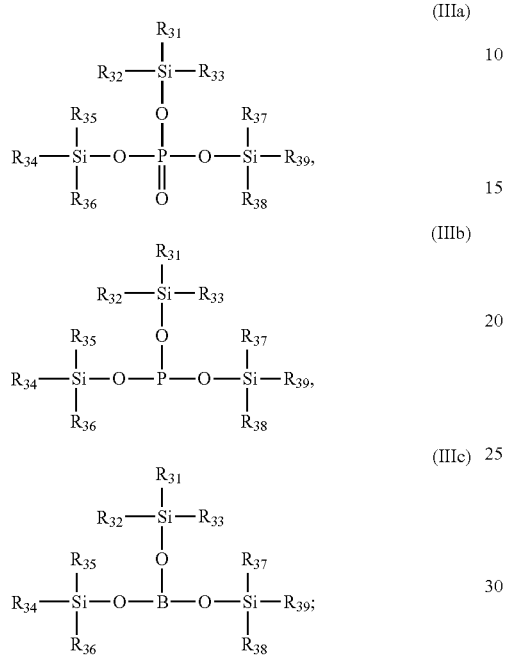

in which, $R_{31}$, $R_{32}$, $R_{33}$, $R_{34}$, $R_{35}$, $R_{36}$, $R_{37}$, $R_{38}$ and $R_{39}$ are selected from a group consisting of substituted $C_{1\sim6}$ alkyls with a substituting group and unsubstituted $C_{1\sim6}$ alkyls, respectively;

wherein the substituting group is selected from a group consisting of $C_{1\sim6}$ alkyls and halogens.

As an improvement to the electrolyte of the present application, $R_{31}$, $R_{32}$, $R_{33}$, $R_{34}$, $R_{35}$, $R_{36}$, $R_{37}$, $R_{38}$ and $R_{39}$ are selected from a group consisting of $C_{1\sim3}$ alkyls, respectively; examples of the alkyls may include methyl, ethyl, n-propyl and isopropyl; the $C_{1\sim3}$ alkyls may include substituted $C_{1\sim3}$ alkyls with the halogen, and part or all of the hydrogens in the $C_{1\sim3}$ alkyls can be substituted by the halogen; examples of substituted $C_{1\sim3}$ alkyls, in which all the hydrogens are substituted by the halogen, may include trifluoromethyl, pentafluoroethyl and heptafluoropropyl.

As an improvement to the electrolyte of the present application, $R_{31}$, $R_{32}$, $R_{33}$, $R_{34}$, $R_{35}$, $R_{36}$, $R_{37}$, $R_{38}$ and $R_{39}$ employ an identical substituting group.

As an improvement to the electrolyte of the present application, the additive C is a combination of a silane phosphate compound and a silane borate compound, and preferably a combination of a silane phosphate and a silane borate which can induce each other during the formation of film, so as to produce a complex film which is more stable at high temperature.

As an improvement to the electrolyte of the present application, the additive C is selected from a group consisting of the following compounds and combinations thereof:

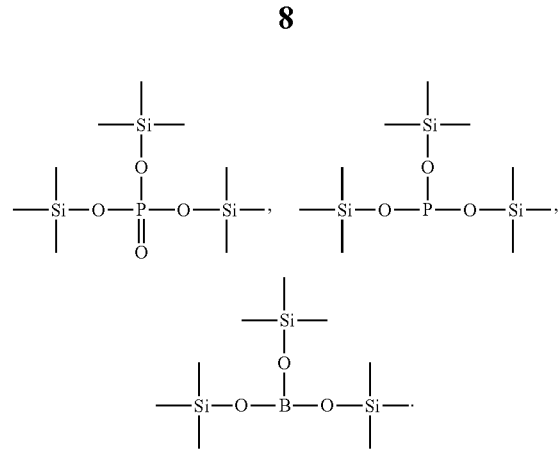

As an improvement to the electrolyte of the present application, the additive C may be otherwise selected from a group consisting of the following compounds and combinations thereof:

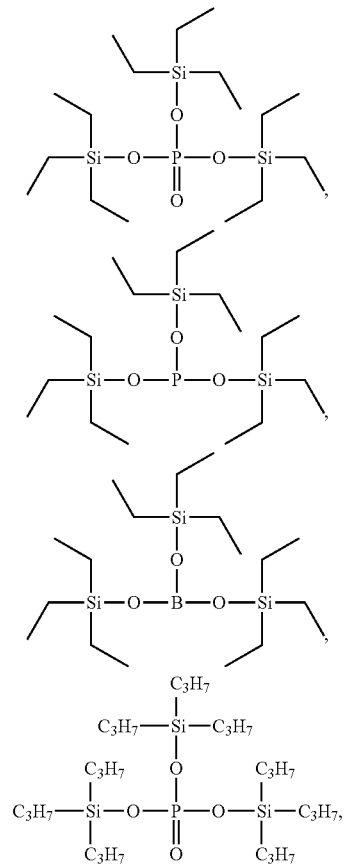

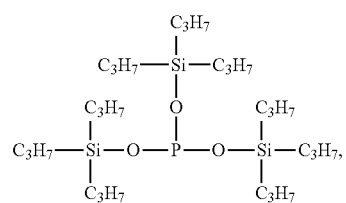

-continued

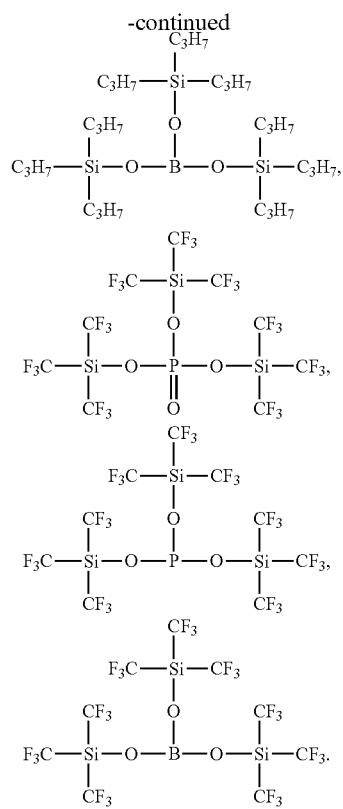

As an improvement to the electrolyte of the present application, a content of the additive C is 0.01%~2% by mass of the electrolyte. The upper limit value of the content of the additive C may be 1%, 1.5% or 1.8%, the lower limit value of the content of the additive C may be 0.02%, 0.05%, 0.1%, 0.2% or 0.25%, and the content of the additive C can be of any range defined by any one of the upper limit values and any one of the lower limit values.

As an improvement to the electrolyte of the present application, the additive D is selected from a group consisting of $LiPOF_4$, $KPOF_4$, $NaPOF_4$, $NaPO_2F_2$, $LiPO_2F_2$, $KPO_2F_2$ and combinations thereof.

As an improvement to the electrolyte of the present application, a content of the additive D is 0.01%~2% by mass of the electrolyte. The upper limit value of the content of the additive D may be 1%, 1.5% or 1.8%, the lower limit value of the content of the additive D may be 0.02%, 0.05%, 0.1%, 0.2% or 0.25%, and the content of the additive D can be of any range defined by any one of the upper limit values and any one of the lower limit values.

As an improvement to the electrolyte of the present application, the organic solvent is at least two of ethylene carbonate, propylene carbonate, butylene carbonate, fluoroethylene carbonate, dimethyl carbonate, diethyl carbonate, dipropyl carbonate, ethyl methyl carbonate, methyl propyl carbonate, ethyl propyl carbonate, γ-butyrolactone, methyl propionate, methyl butyrate, ethyl acetate, propyl propionate, ethyl propionate and ethyl butyrate.

As an improvement to the electrolyte of the present application, the lithium salt is selected from a group consisting of lithium hexafluorophosphate, lithium tetrafluoroborate, lithium bis(oxalate)borate, lithium oxalyldifluoroborate and combinations thereof, and is preferably lithium hexafluorophosphate.

The present application further relates to a lithium-ion battery, including a positive electrode, a negative electrode, a separator and the electrolyte described above in the present application.

As an improvement to the lithium-ion battery of the present application, the material for the positive electrode is a lithium nickel-manganese-cobalt oxide material, which is preferably selected from a group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$ and combinations thereof.

Unless otherwise noted, all reagents, materials and instruments used in the following examples, comparative examples and test examples are commercially available.

Embodiment 1 Preparation of Batteries 1-33

In the following examples, comparative examples and test examples, the following materials are used:
Organic solvent: ethylene carbonate (EC), diethyl carbonate (DEC);
Lithium salt: $LiPF_6$;
Additive A:
Additive A1: 1,3-propanesultone;
Additive A2: 1,4-butanesultone;
Additive A3: 1,5-pentanesultone;
Additive A4: 1,6-hexnaesultone;
Additive A5: methylene methanedisulfonate
Additive B:
Additive B1: 1,2-ethylene sulfate;
Additive B2: 1,3-propylene sulfate;
Additive B3: propane 1,2-cyclic sulfate;
Additive C:
Additive C1: tris(trimethylsilyl) phosphate;
Additive C2: tris(trimethylsilyl) phosphite;
Additive C3: tris(trimethylsilyl) borate;
Additive D:
Additive D1: $LiPOF_4$;
Additive D2: $LiPO_2F_2$;
Additive D3: $NaPOF_4$;
Additive D4: $NaPO_2F_2$;
Additive D5: $KPOF_4$;
Additive D6: $KPO_2F_2$;
Separator for lithium batteries: polypropylene separator with a thickness of 16 μm (Model: A273, provided by Celgard Corporation);
Material for positive electrode: $LiNi_{1/3}Co_{1/3}Mn_{1/3}O_2$.
(I) Preparation of Lithium-Ion Batteries (Batteries 1-10) of Comparative Examples 1-10
(1) Preparation of Positive Electrode Plate
The positive electrode blends of the lithium nickel-manganese-cobalt oxide material, conductive agent of acetylene black and binder of polyvinylidene fluoride (PVDF) with a mass ratio of 96:2:2 are evenly mixed by stirring in a solvent system of N-methyl pyrrolidone, then coated onto an Al foil, dried, and cold-pressed, so as to obtain a positive electrode plate.
(2) Preparation of Negative Electrode Plate
The negative electrode blends of graphite, conductive agent of acetylene black, binder of styrene-butadiene rubber (SBR) and thickener of sodium carboxymethyl cellulose (CMC) with a mass ratio of 94:2:2:2 are evenly mixed by stirring in a solvent system of deionized water, then coated onto a Cu foil, dried and cold pressed, so as to obtain a negative electrode plate.
(3) Preparation of Electrolyte
In a glove box filled with argon atmosphere with a moisture content of <10 ppm, the lithium salt which has been fully dried is dissolved into the abovementioned organic solvent, where one, two or three of the abovementioned additives are then added and evenly mixed, so as to obtain an electrolyte, of which the concentration of the lithium salt is 1 mol/L.

(4) Preparation of Lithium-Ion Battery

The positive electrode plate, separator, negative electrode plate and another separator are placed in sequence and then winded to form a bare cell, so that the separator can insulate the positive electrode plate from the negative electrode plate; the bare cell is then packaged into an aluminum-plastic film packaging bag, then dried to remove moisture, injected with the prepared electrolyte, sealed, resided, formed and shaped, so as to obtain a battery.

In the preparation of the abovementioned batteries, the specific type and content of the electrolyte adopted in each of the batteries and the additives used in each of the electrolytes are shown in Table 1.

In Table 1, the content of the additive is represented by a weight percentage of the total weight of the electrolyte.

TABLE I

| Battery No. | Electrolyte No. | Organic solvent (mass ratio) | Additive A type | Additive A content | Additive B type | Additive B content | Additive C type | Additive C content | Additive D type | Additive D content |
|---|---|---|---|---|---|---|---|---|---|---|
| Battery 1 | Electrolyte 1 | EC/DEC = 30/70 | A1 | 3% | — | — | — | — | — | — |
| Battery 2 | Electrolyte 2 | EC/DEC = 30/70 | A2 | 8% | B1 | 2% | — | — | — | — |
| Battery 3 | Electrolyte 3 | EC/DEC = 30/70 | A5 | 2% | B2 | 6% | — | — | — | — |
| Battery 4 | Electrolyte 4 | EC/DEC = 30/70 | A3 | 2% | B3 | 2% | — | — | — | — |
| Battery 5 | Electrolyte 5 | EC/DEC = 30/70 | A4 | 2% | B3 | 3% | — | — | — | — |
| Battery 6 | Electrolyte 6 | EC/DEC = 30/70 | — | — | — | — | C1 | 1% | — | — |
| Battery 7 | Electrolyte 7 | EC/DEC = 30/70 | — | — | — | — | C3 | 1% | — | — |
| Battery 8 | Electrolyte 8 | EC/DEC = 30/70 | — | — | — | — | — | — | D1 | 1% |
| Battery 9 | Electrolyte 9 | EC/DEC = 30/70 | — | — | — | — | — | — | D3 | 1% |
| Battery 10 | Electrolyte 10 | EC/DEC = 30/70 | — | — | — | — | — | — | D5 | 1% |

The expression of "-" indicates that the corresponding material is not added.

(II) Preparation of Lithium-Ion Batteries (Batteries 11-33) of Examples 1-10

The method for preparing batteries is the same as that in the Comparative examples, in which all the conditions are the same except that the types, combinations and contents of the additives are different.

In the preparation of the abovementioned batteries, the specific type and content of the electrolyte adopted in each of batteries and additives used in each of the electrolytes are shown in Table 2.

In Table 2, the content of the additive is represented by a weight percentage of the total weight of the electrolyte.

TABLE 2

| Battery No. | Electrolyte No. | Organic solvent (mass ratio) | Additive A type | Additive A content | Additive B type | Additive B content | Additive C type | Additive C content | Additive D type | Additive D content |
|---|---|---|---|---|---|---|---|---|---|---|
| Battery 11 | Electrolyte 11 | EC/DEC = 30/70 | A1 | 2% | B1 | 1% | C1 | 1% | — | — |
| Battery 12 | Electrolyte 12 | EC/DEC = 30/70 | A2 | 5% | B2 | 3% | C2 | 2% | — | — |
| Battery 13 | Electrolyte 13 | EC/DEC = 30/70 | A3 | 3% | B3 | 0.01% | C1 | 1% | — | — |
| Battery 14 | Electrolyte 14 | EC/DEC = 30/70 | A4 | 0.01% | B3 | 5% | C3 | 1% | — | — |
| Battery 15 | Electrolyte 15 | EC/DEC = 30/70 | A5 | 1% | B3 | 2% | — | — | D1 | 1% |
| Battery 16 | Electrolyte 16 | EC/DEC = 30/70 | A1 | 1% | B3 | 2% | — | — | D3 | 0.5% |
| Battery 17 | Electrolyte 17 | EC/DEC = 30/70 | A1 | 1% | B1 | 1% | C1 | 0.5% | D1 | 0.5% |
| Battery 18 | Electrolyte 18 | EC/DEC = 30/70 | A1 | 2% | B1 | 3% | C1 C3 | 0.01% 0.5% | D1 | 0.5% |

TABLE 2-continued

| Battery No. | Electrolyte No. | Organic solvent (mass ratio) | Additive A type | Additive A content | Additive B type | Additive B content | Additive C type | Additive C content | Additive D type | Additive D content |
|---|---|---|---|---|---|---|---|---|---|---|
| Battery 19 | Electrolyte 19 | EC/DEC = 30/70 | A2 | 4% | B1 | 1% | C1<br>C3 | 1%<br>0.01% | D3 | 0.5% |
| Battery 20 | Electrolyte 20 | EC/DEC = 30/70 | A2 | 4% | B2 | 0.5% | C1 | 1% | D3 | 0.01% |
| Battery 21 | Electrolyte 21 | EC/DEC = 30/70 | A1 | 3% | B1 | 3% | C1 | 0.01% | — | — |
| Battery 22 | Electrolyte 22 | EC/DEC = 30/70 | A2 | 3% | B2 | 3% | C2 | 1% | — | — |
| Battery 23 | Electrolyte 23 | EC/DEC = 30/70 | A3 | 3% | B3 | 3% | C1 | 2% | — | — |
| Battery 24 | Electrolyte 24 | EC/DEC = 30/70 | A5 | 1% | B3 | 2% | — | — | D1 | 0.01% |
| Battery 25 | Electrolyte 25 | EC/DEC = 30/70 | A1 | 1% | B3 | 2% | — | — | D3 | 2% |
| Battery 26 | Electrolyte 26 | EC/DEC = 30/70 | A1 | 1% | B1 | 2% | C1 | 0.01% | D1 | 0.5% |
| Battery 27 | Electrolyte 27 | EC/DEC = 30/70 | A1 | 1% | B1 | 2% | C1 | 0.5% | D1 | 0.5% |
| Battery 28 | Electrolyte 28 | EC/DEC = 30/70 | A1 | 1% | B1 | 2% | C1 | 2% | D1 | 0.5% |
| Battery 29 | Electrolyte 29 | EC/DEC = 30/70 | A1 | 1% | B1 | 2% | C1<br>C3 | 0.01%<br>1% | D1 | 0.5% |
| Battery 30 | Electrolyte 30 | EC/DEC = 30/70 | A2 | 1% | B1 | 2% | C1<br>C3 | 1%<br>1% | D3 | 0.5% |
| Battery 31 | Electrolyte 31 | EC/DEC = 30/70 | A2 | 1% | B2 | 2% | C1 | 0.5% | D3 | 0.01% |
| Battery 32 | Electrolyte 32 | EC/DEC = 30/70 | A2 | 1% | B2 | 2% | C1 | 0.5% | D3 | 1% |
| Battery 33 | Electrolyte 33 | EC/DEC = 30/70 | A2 | 1% | B2 | 2% | C1 | 0.5% | D3 | 2% |

The expression of "------" indicates that the corresponding material is not added.

(III) Testing Method of Battery Performance

Test 1: Direct Current Resistance (DCR) Test of Batteries at Low Temperature

The following test is conducted to each of prepared batteries:

The SOC of battery is adjusted to 20% at normal temperature (25° C.), then the battery is placed into a high-low temperature box at −25° C. and resided for 2 hours so as to reach −25° C. The battery is then discharged with a C-rate of 0.3 C for 10 seconds. The voltage before discharging is U1, while the voltage after discharging is U2, and the discharging DCR=(U1−U2)/I. DCR results of all batteries are shown in Table 3.

Test 2: Storage Test (Calendar Life) of Battery at High Temperature

The following test is conducted to each of prepared batteries:

The capacity of the battery is tested at normal temperature (25° C.) and is recorded as initial capacity; then, the battery is fully charged to 4.2V at 1 C, charged to 0.05 C with constant voltage, and then stored in an oven at 60° for 1 month, taken out and placed into normal environment (25° C.) for more than 3 hours to reduce the temperature of the cell to the normal temperature, and then tested for the reversible capacity (the battery is discharged to the cut-off voltage with 1 C, standby for 5 minutes, fully charged with IC, charged to 0.05 C with constant voltage, standby for 5 minutes and discharged to cut-off voltage with 1 C; then, the capacity is tested and recorded as the reversible capacity of the cell after storage); the battery is fully charged after the tests, then stored in an oven at 60° C. during which the reversible capacity is tested every 1 month until the reversible capacity of the cell falls to 80% of the initial capacity, and the time is recorded as calendar life of the cell. The data of each battery is shown in Table 3.

Test 3: Gas Production of Battery During Storage at High Temperature

The following test is conducted to each prepared battery:

The battery is fully charged to 4.2V with 1 C at normal temperature (25° C.), charged to 0.05 C with constant voltage, and then tested for the volume of the battery which is recorded as initial volume of the battery by a drainage method. The battery is then stored in an oven at 80° C. during which the volume of battery is tested every two days; volume expansion ratio=volume after storage/initial volume−1, and the number of days when the volume expansion ratio reaches 30% is recorded as gas production time capable of withstanding 80° C. Data of each battery is shown in Table 3.

Test 4: Cycle Life of Batteries

The following test is conducted to each prepared battery:

In a first cycle, the battery is charged to 4.2V with IC at 25° C., charged to 0.05 C with constant voltage, and then discharged to 2.8V with constant current of IC; then, the battery is repeated for charge/discharge as described in the first cycle until the capacity retention rate of battery falls to 80% and at this time the number of cycling times is recorded as cycle life of the battery. The obtained relevant test data of each battery is shown in Table 3.

Capacity retention rate after cycle=(discharge capacity after corresponding cycling times/initial discharge capacity of the first cycle)×100%

TABLE 3

| Battery No. | -25° C. DCR (mOhm) | 60° C. calendar life (month) | Days for storage at 80° C. when volume expansion rate reaches 30% | 25° C. Cycle Life (cycling times when capacity retention rate reaches 80%) |
|---|---|---|---|---|
| Battery 1 | 791 | 4 | 34 | 2326 |
| Battery 2 | 1114 | 11 | 56 | 1676 |
| Battery 3 | 802 | 9 | 30 | 1811 |
| Battery 4 | 754 | 10 | 30 | 2043 |
| Battery 5 | 766 | 9 | 30 | 2155 |
| Battery 6 | 598 | 4 | 4 | 1587 |
| Battery 7 | 577 | 4 | 2 | 1191 |
| Battery 8 | 542 | 6 | 6 | 1829 |
| Battery 9 | 556 | 6 | 6 | 1633 |
| Battery 10 | 590 | 6 | 6 | 1431 |
| Battery 11 | 671 | 13 | 30 | 5274 |
| Battery 12 | 705 | 17 | 50 | 4309 |
| Battery 13 | 694 | 11 | 40 | 4701 |
| Battery 14 | 643 | 22 | 22 | 4580 |
| Battery 15 | 637 | 17 | 16 | 4636 |
| Battery 16 | 653 | 14 | 16 | 4575 |
| Battery 17 | 635 | 15 | 14 | 4611 |
| Battery 18 | 690 | 14 | 30 | 5716 |
| Battery 19 | 699 | 19 | 46 | 4419 |
| Battery 20 | 695 | 17 | 46 | 4305 |
| Battery 21 | 781 | 10 | 42 | 3955 |
| Battery 22 | 702 | 12 | 42 | 4210 |
| Battery 23 | 658 | 13 | 42 | 4362 |
| Battery 24 | 660 | 9 | 16 | 3827 |
| Battery 25 | 610 | 11 | 22 | 4662 |
| Battery 26 | 642 | 10 | 18 | 4309 |
| Battery 27 | 623 | 11 | 18 | 4510 |
| Battery 28 | 596 | 14 | 18 | 4569 |
| Battery 29 | 571 | 15 | 18 | 4511 |
| Battery 30 | 549 | 16 | 18 | 4610 |
| Battery 31 | 610 | 10 | 16 | 4578 |
| Battery 32 | 592 | 12 | 20 | 4681 |
| Battery 33 | 561 | 14 | 22 | 4710 |

It can be known from the relevant results in Table 3 that: Comparative batteries 1-5 use a relatively large amount of additive A and additive B and has small gas production but large DCR;

Batteries 6-10 of Comparative examples uses additive C additive D and has low DCR but poor cycle life and large gas production.

Battery 18 and Battery 19 use both silane phosphate and silane borate which induce each other during film formation, and the formed complex film is more stable at high temperature and has much lower DCR, longer cycle life as well as excellent performance in calendar life at 60° C. and volume expansion at 80° C.

In Examples 11-20, batteries have good comprehensive performance (low DCR, longer storage life at high temperature, long calendar life and long cycle life) as a function of the application of sultones and cyclic sulfates as well as synergistic effects of silane phosphate or silane borate or fluoro-phosphate salts.

Embodiment 2

Electrolytes and lithium-ion batteries containing such electrolytes are prepared according to the same method as described in Embodiment 1 except that the lithium salts, organic solvents and positive electrode materials in the batteries are shown in Table 4 and the ratio of additives and the structural formulas of the additive compounds are shown in Table 5 and Table 6, respectively.

TABLE 4

| Battery No. | Positive electrode material | Lithium salt | Organic solvent |
|---|---|---|---|
| Battery 34 | $LiNi_{0.6}Co_{0.2}Mn_{0.2}O_2$ | lithium tetrafluoroborate | EC/DEC = 30/70 |
| Battery 35 | $LiNi_{0.8}Co_{0.1}Mn_{0.1}O_2$ | lithium tetrafluoroborate | EC/DEC = 30/70 |
| Battery 36 | $LiNi_{0.6}Co_{0.2}Mn_{0.2}O_2$ | lithium bis(oxalate)borate | EC/DEC = 30/70 |
| Battery 37 | $LiNi_{0.5}Co_{0.2}Mn_{0.3}O_2$ | lithium bis(oxalate)borate | EC/PC/DEC = 30/20/50 |
| Battery 38 | $LiNi_{0.5}Co_{0.2}Mn_{0.3}O_2$ | lithium bis(oxalate)borate | EC/DEC = 30/70 |
| Battery 39 | $LiNi_{0.5}Co_{0.2}Mn_{0.3}O_2$ | lithium oxalyldifluoroborate | EC/DEC = 30/70 |
| Battery 40 | $LiNi_{0.5}Co_{0.2}Mn_{0.3}O_2$ | lithium oxalyldifluoroborate | EC/DEC = 30/70 |
| Battery 41 | $LiNi_{0.6}Co_{0.2}Mn_{0.2}O_2$ | lithium hexafluorophosphate | EC/EMC/DEC = 30/30/40 |
| Battery 42 | $LiNi_{0.8}Co_{0.1}Mn_{0.1}O_2$ | lithium hexafluorophosphate | EC/DEC = 30/70 |

TABLE 5

| | Additive A | | Additive B | | Additive C | | Additive D | |
|---|---|---|---|---|---|---|---|---|
| Battery No. | type | content | type | content | type | content | type | content |
| Electrolyte 34 | AI | 3% | BI | 1% | CI | 1% | D2 | 1% |
| Electrolyte 35 | AI | 3% | BI | 1% | CI | 1% | D2 | 0.5% |
| Electrolyte 36 | AII | 3% | BI | 2% | CI | 0.5% | D2 | 1% |
| Electrolyte 37 | AII | 2% | BII | 3% | CII | 0.5% | D4 | 0.5% |
| Electrolyte 38 | AII | 2% | BII | 3% | CII | 1% | D4 | 0.5% |
| Electrolyte 39 | AIII | 2% | BII | 3% | CII | 1% | D4 | 1% |
| Electrolyte 40 | AIII | 1% | BIII | 2% | CIII | 0.5% | D6 | 0.5% |
| Electrolyte 41 | AIII | 1% | BIII | 3% | CIII | 0.5% | D6 | 0.5% |
| Electrolyte 42 | AIII | 1% | BIII | 2% | CIII | 1% | D6 | 1% |

TABLE 6

| Additive | I | II | III |
|---|---|---|---|
| A | | | |
| B | | | |
| C | | | |

The obtained batteries are tested according to the same methods as described in Embodiment 1, the obtained test results of Batteries 34-42 are similar to those in preceding embodiments, which will not be detailed herein.

The above are merely preferred embodiments of the present application which will not limit the implementing manners of the present application, and all the equivalent variations, modifications, substitutes, combinations and simplifications without departing from the spirit essence and principles of the present application shall fall into the protection scope of the present application.

What is claimed is:

1. A lithium-ion battery, comprising:
   a positive electrode;
   a negative electrode;
   a separator; and
   an electrolyte, comprising a lithium salt, an organic solvent and additives, wherein the additives comprise an additive A, an additive B, an additive C, and an additive D; wherein,
   additive A: cyclic sultones;
   additive B: cyclic sulfates;
   additive C;
   additive D: fluoro-phosphate salts,
   wherein a material for the positive electrode is a lithium nickel-manganese-cobalt oxide which is selected from the group consisting of $LiNi_{0.6}Co_{0.2}Mn_{0.2}O_2$, $LiNi_{0.8}Co_{0.1}Mn_{0.1}O_2$ and a combination thereof,
   the additive C is selected from the following compounds:

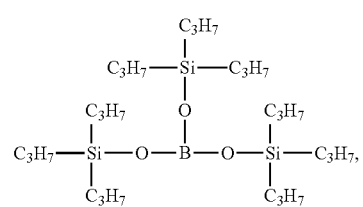

-continued

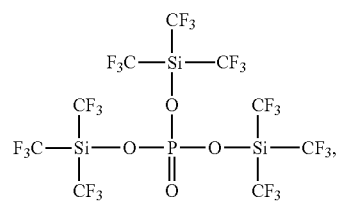

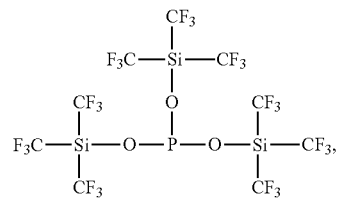

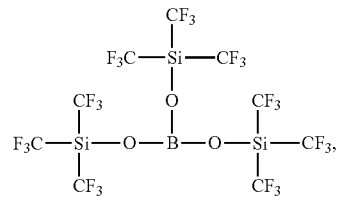

a content of the additive A is 0.01-0.5% by mass of the electrolyte, a content of the additive B is 0.01-5% by mass of the electrolyte, a content of the additive C is 0.01-2% by mass of the electrolyte, and a content of the additive D is 0.01-2% by mass of the electrolyte.

2. The lithium-ion battery according to claim 1, wherein the additive A is selected from a group consisting of compounds shown as Formula Ia, compounds shown as Formula Ib and combinations thereof;

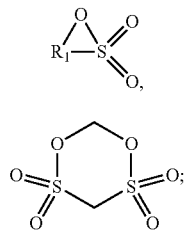
(Ia)

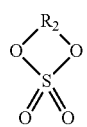
(Ib)

wherein, $R_1$ is selected from a group consisting of substituted $C_{3-8}$ alkylenes with a substituting group and unsubstituted $C_{3-8}$ alkylenes;

the substituting group is selected from a group consisting of $C_{1-6}$ alkyls and halogens;

the additive A is preferably selected from a group consisting of 1,3-propanesultone, 1,4-butanesultone, 1,5-pentanesultone, 1,6-hexnaesultone, methylene methanedisulfonate and combinations thereof.

3. The lithium-ion battery according to claim 1, wherein the additive B is selected from a group consisting of compounds shown as Formula II and combinations thereof;

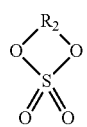
(II)

wherein, $R_2$ is selected from a group consisting of substituted $C_{1-6}$ alkylenes with a substituting group and unsubstituted $C_{1-6}$ alkylenes;

the substituting group is selected from a group consisting of $C_{1-6}$ alkyls and halogens;

the additive B is preferably selected from a group consisting of 1,2-ethylene sulfate, 1,3-propylene sulfate, propane 1,2-cyclic sulfate and combinations thereof.

4. The lithium-ion battery according to claim 1, wherein the additive C is selected from a group consisting of compounds shown as Formula IIIa, compounds shown as Formula IIIb, compounds shown as Formula IIIc and combinations thereof;

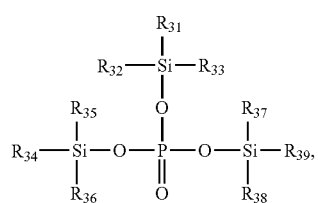
(IIIa)

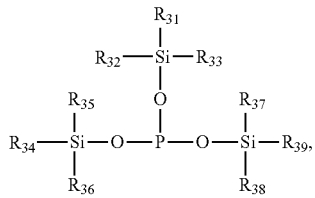
(IIIb)

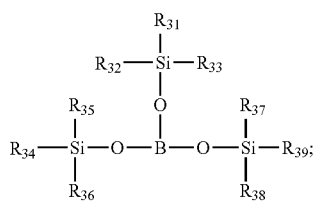
(IIIc)

wherein, $R_{31}$, $R_{32}$, $R_{33}$, $R_{34}$, $R_{35}$, $R_{36}$, $R_{37}$, $R_{38}$ and $R_{39}$ are selected from a group consisting of substituted $C_{1-6}$ alkyls with a substituting group and unsubstituted $C_{1-6}$ alkyls, respectively;

the substituting group is selected from a group consisting of $C_{1-6}$ alkyls and halogens;

the additive C is preferably selected from a group consisting of tris(trimethylsilyl) phosphate, tris(trimethylsilyl) phosphite, tris(trimethylsilyl) borate and combinations thereof.

5. The lithium-ion battery according to claim 1, wherein the additive D is selected from a group consisting of $LiPOF_4$, $KPOF_4$, $NaPOF_4$, $NaPO_2F_2$, $LiPO_2F_2$, $KPO_2F_2$ and combinations thereof.

6. The lithium-ion battery according to claim 1, wherein the organic solvent is at least two of ethylene carbonate, propylene carbonate, butylene carbonate, fluoroethylene carbonate, dimethyl carbonate, diethyl carbonate, dipropyl carbonate, ethyl methyl carbonate, methyl propyl carbonate, ethyl propyl carbonate, γ-butyrolactone, methyl propionate, methyl butyrate, ethyl acetate, propyl propionate, ethyl propionate and ethyl butyrate.

7. The lithium-ion battery according to claim 1, wherein the lithium salt is selected from a group consisting of lithium hexafluorophosphate, lithium tetrafluoroborate, lithium bis(oxalate)borate, lithium oxalyldifluoroborate and combinations thereof, and is preferably lithium hexafluorophosphate.

8. The lithium-ion battery according to claim 1, wherein the additive A is 1,3-propanesultone.

9. The lithium-ion battery according to claim 1, wherein the additive B is 1,2-ethylene sulfate.

10. The lithium-ion battery according to claim 1, wherein the additive C is tris(trimethylsilyl) phosphate, and the additive D is $LiPO_2F_2$.

11. The lithium-ion battery according to claim 1, wherein the lithium salt is lithium hexafluorophosphate.

* * * * *